United States Patent
Tsukada (10) Patent No.: US 10,936,932 B2
(45) Date of Patent: Mar. 2, 2021

(54) DUAL IC CARDS AND ANTENNA SHEETS

(71) Applicant: TOPPAN PRINTING CO., LTD., Tokyo (JP)

(72) Inventor: Tetsuya Tsukada, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/428,389

(22) Filed: May 31, 2019

(65) Prior Publication Data

US 2019/0286967 A1  Sep. 19, 2019

Related U.S. Application Data

(63) Continuation of application No. PCT/JP2017/043801, filed on Dec. 6, 2017.

(30) Foreign Application Priority Data

Dec. 6, 2016 (JP) ............................. JP2016-236839

(51) Int. Cl.
*G06K 19/077* (2006.01)
*H01Q 7/00* (2006.01)
*H04B 5/02* (2006.01)

(52) U.S. Cl.
CPC ..... *G06K 19/07773* (2013.01); *G06K 19/077* (2013.01); *G06K 19/07743* (2013.01); *H01Q 7/00* (2013.01); *H04B 5/02* (2013.01)

(58) Field of Classification Search
CPC ....... G06K 19/07773; G06K 19/07743; G06K 19/077; G06K 19/07769; G06K 19/07794; H01Q 7/00; H04B 5/02
See application file for complete search history.

(56) References Cited

U.S. PATENT DOCUMENTS

| 9,033,250 B2* | 5/2015 | Finn | G06K 19/07783 235/492 |
| 2014/0224886 A1* | 8/2014 | Nihei | G06K 19/07783 235/492 |
| 2016/0104065 A1* | 4/2016 | Tsukada | G06K 19/07769 235/492 |

FOREIGN PATENT DOCUMENTS

| EP | 1 031 939 | 8/2000 |
| FR | 2915010 A | 10/2008 |

(Continued)

OTHER PUBLICATIONS

International Searching Authority, "International Search Report," issued in connection with International Patent Application No. PCT/JP2017/043801, dated Jan. 30, 2018.

(Continued)

*Primary Examiner* — Sonji N Johnson
(74) *Attorney, Agent, or Firm* — Foley & Lardner LLP (57) ABSTRACT

A dual IC card with an IC chip having both a contact-type transmission function and a contactless-type transmission function, and a module substrate having an external terminal, which is a contact-type transmission portion, and a connecting coil, which is a contactless-type transmission portion; an antenna sheet including an antenna substrate having first and second surfaces, a coupling coil having a second surface coil provided on a second surface of the antenna substrate, the coupling coil configured to be electromagnetically coupled to the connecting coil, and an antenna coil connected to the coupling coil for contactless communication with an external device; and a card body in a plate-shape housing the antenna sheet and with a recess for the IC module, with at least a part of the second surface coil positioned inside the recess when viewed in a thickness direction.

3 Claims, 5 Drawing Sheets

(56) References Cited

FOREIGN PATENT DOCUMENTS

| JP | 2013-105306 A | | 5/2013 | |
|---|---|---|---|---|
| JP | 2013105306 A | * | 5/2013 | |
| JP | 2016-134067 A | | 7/2016 | |
| JP | 2016134067 A | * | 7/2016 | |
| WO | WO-96/35190 A1 | | 11/1996 | |
| WO | WO-99/26195 A1 | | 5/1999 | |
| WO | WO-2013073702 A1 | * | 5/2013 | ....... G06K 19/07769 |
| WO | WO-2014/208437 A1 | | 12/2014 | |
| WO | WO-2014208437 A1 | * | 12/2014 | ....... G06K 19/07769 |

OTHER PUBLICATIONS

International Searching Authority, "Written Opinion," issued in connection with International Patent Application No. PCT/JP2017/043801, dated Jan. 30, 2018.
Extended European Search Report dated Oct. 25, 2019 for corresponding Application No. 17877437.8 (7 pages).

\* cited by examiner

DUAL IC CARDS AND ANTENNA SHEETS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/043801, filed on Dec. 6, 2017, which is based upon and claims the benefit of priority to Japanese Patent Application No. 2016-236839, filed on Dec. 6, 2016; the disclosures of which are all incorporated herein by reference in their entireties.

TECHNICAL FIELD

The present invention relates to a dual IC card that can perform contact communication and contactless communication and an antenna sheet for use with the dual IC card.

BACKGROUND ART

IC modules incorporating an IC chip having a contact communication function and a contactless communication function can be used in different communication modes depending on the applications, and are therefore 106915-0 available for various applications. For example, there have been known dual IC cards in which an IC module is mounted on a card body such that the power supply and communication between the IC module and the card body can be performed via electromagnetic coupling (such as electromagnetic coupling and transformer coupling).

In applications of the dual IC cards which deal with large quantities of data exchange in credit transactions or communication for account settlement information, which require reliability and security, contact communication is used. On the other hand, in applications mainly for authentication such as gate access control and dealing with a small amount of communication data, contactless communication is used.

The IC module and the card body can be electromagnetically connected via electromagnetic coupling to reduce instability in electric connection between the IC module and the card body. On the other hand, when the IC module and the card body are directly connected via an electrically conductive connecting material such as solder, the connecting material may be broken when the dual IC card is bent.

As described in PTLs 1 and 2, there have been known dual IC cards in which an IC module and a card body can be electrically connected via electromagnetic coupling.

In dual IC cards in which an IC module and a card body can be electrically connected via electromagnetic coupling, a terminal (contact terminal portion) for contact communication with a contact-type external device is provided on a front surface of the IC module, and a connecting coil for contactless communication is provided on a rear surface of the IC module.

The card body includes an antenna substrate having a sheet-shaped resin (substrate) on which a coupling coil and an antenna coil (main coil) formed of a printed coil and a resin sheets are laminated on the front and rear surfaces of the antenna sheet. The IC module is disposed in a recess formed near the coupling coil of the card body.

The thickness of the card body significantly changes at a region close to the recess. Accordingly, when an external force is applied to bend the card body, a stress is concentrated on the outer periphery of the bottom of the recess. As a consequence, the dual IC card is easily broken in the recess.

When the coupling coil is located in a region overlapped with the recess in plan view or in a region close to the recess, there is a problem that the wiring of the coupling coil is likely to be disconnected due to the stress concentration described above, besides the problem of breakage of the card body.

PTL 3 describes a dual IC card that can reduce failure due to breakage of a coupling coil even if a bending stress is generated due to an external force.

CITATION LIST

[Patent Literature] PTL 1: WO 99/26195-A1; PTL 2: WO 96/35190-A1; PTL 3: WO 2014/208437-A1.

SUMMARY OF THE INVENTION

Technical Problem

In the dual IC card described in PTL 3, a coupling coil is positioned outside a recess in plan view in order to prevent disconnection of the wiring of the coupling coil.

The closer the connecting coil of the IC module and the coupling coil of the card body are located, the stronger the electromagnetic connection between these coils. Accordingly, contactless communication performance can be improved. In this regard, it is desired that the coupling coil is also positioned inside the recess in plan view.

In the case where the coupling coil is positioned inside the recess in plan view, prevention of disconnection of the wiring of the coupling coil is still desired.

The present invention has been made in view of the above problem. An object of the invention is to provide a dual IC card having higher contactless communication performance. Further, another object of the invention is to provide a dual IC card and an antenna sheet having higher durability.

[Improvement or Solution to Problem]

A dual IC card according to an aspect of the present invention includes an IC module that includes an IC chip having both a contact-type transmission function and a contactless-type transmission function, and a module substrate having an external terminal, which is a contact-type transmission portion, and a connecting coil, which is a contactless-type transmission portion, an antenna sheet that includes an antenna substrate having a first surface and a second surface, a coupling coil having a second surface coil provided on a second surface of the antenna substrate, the coupling coil being configured to be electromagnetically coupled to the connecting coil of the IC module, and an antenna coil connected to the coupling coil for contactless communication with a contactless-type external device, and a card body in a plate-shape which houses the antenna sheet and has a recess for accommodating the IC module, wherein at least part of the second surface coil is positioned inside a region in which the recess of the card body is formed when viewed in a thickness direction of the card body.

When viewed in the thickness direction of the card body, a portion of the second surface coil which is located at a boundary between a region in which the recess is formed and a region in which the recess is not formed may have a width larger than a width of a remaining portion of the second surface coil.

The recess may have a rectangular shape composed of two first sides parallel with a long side of the card body and two second sides parallel with a short side of the card body when viewed in the thickness direction of the card body, and the second surface coil may extend to cross one or both of the two second sides when viewed in the thickness direction of the card body.

The recess of the card body may include a first recess formed near a front surface of the card body, and a second recess communicating with the first recess and having an opening width smaller than the first recess, and at least part of the second surface coil may be positioned inside a region in which the first recess is formed and the second recess is not formed when viewed in the thickness direction of the card body.

The coupling coil may further include a first surface coil provided on a first surface of the antenna substrate, and a connecting section that connects the first surface coil and the second surface coil, and the first surface coil may be positioned outside a region of the card body in which the recess is formed when viewed in the thickness direction of the card body.

An antenna sheet according to an aspect of the present invention includes an antenna substrate having a first surface and a second surface, a coupling coil configured to be electromagnetically coupled to a connecting coil of an IC module, and an antenna coil connected to the coupling coil for contactless communication with a contactless-type external device, wherein the coupling coil includes a first surface coil provided on a first surface of the antenna substrate, a second surface coil provided on a second surface of the antenna substrate, and a connecting section that connects the first surface coil and the second surface coil, and at least part of the second surface coil is positioned inside the first surface coil when viewed in the thickness direction of the antenna substrate.

[Desired Advantageous Effects of Invention]

According to some of the above aspects, a dual IC card and an antenna sheet having high contactless communication performance can be provided. Further, according to some of the above aspects, a dual IC card and an antenna sheet having high durability can be provided.

DESCRIPTION OF REPRESENTATIVE EMBODIMENTS

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

With reference to FIGS. 1 to 4, a dual IC card 1 and an antenna sheet 12 according to an embodiment will be described. In FIGS. 1 to 4, a direction D represents a thickness direction of the dual IC card 1 (antenna sheet 12), and directions E and F represent directions parallel with a short side and a long side of the dual IC card 1 (antenna sheet 12), respectively.

Figure 1:
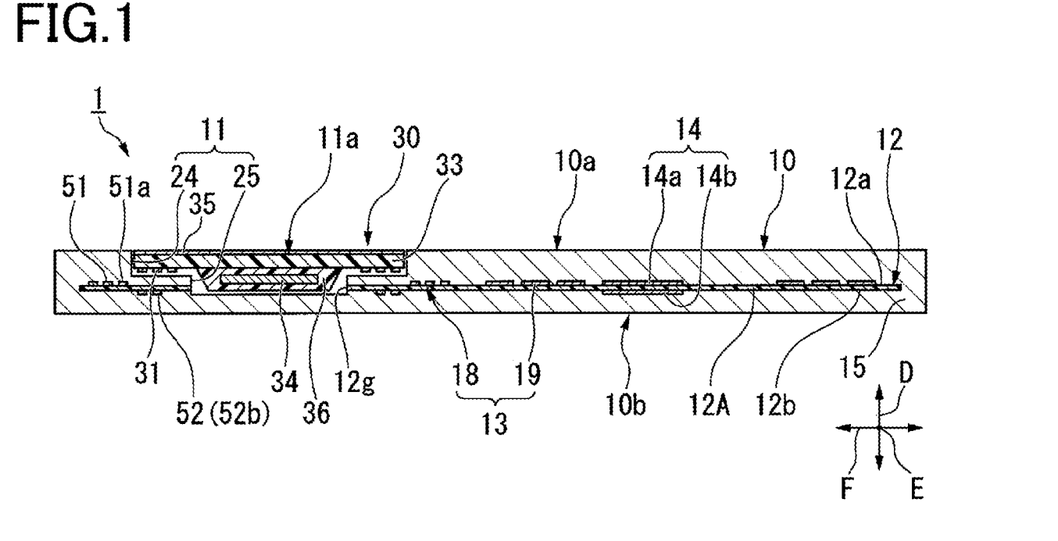
FIG. 1 is a schematic cross-sectional view illustrating a dual IC card according to an embodiment of the present invention.
Figure 2:
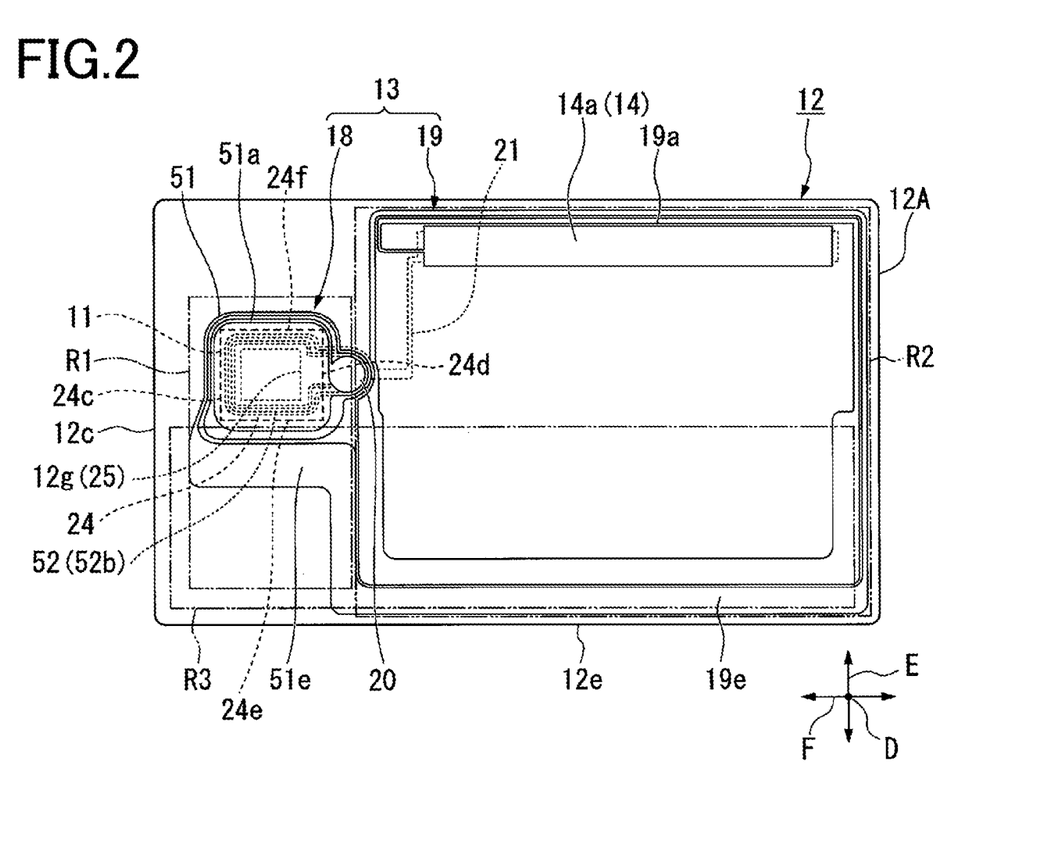
FIG. 2 is a plan view illustrating an antenna sheet of the dual IC card.

As shown in FIGS. 1 and 2, the dual IC card 1 includes the antenna sheet 12, a plate-shaped card body 10 that accommodates the antenna sheet 12 and is formed with a recess 11, and an IC module 30 accommodated in the recess 11.

FIG. 1 is a schematic cross-sectional view illustrating the dual IC card 1. In the figure, the number of turns of an antenna 13, described later, is shown in simplified form. FIG. 2 illustrates the antenna sheet 12 in the card body 10.

The antenna sheet 12 includes an antenna substrate 12A having a first surface 12a and a second surface 12b, and an antenna 13. In the example shown in FIG. 2, the antenna sheet 12 further includes a capacitive element 14 that is electrically connected to the antenna 13. FIG. 2 illustrates an example of arrangement of the antenna 13 and the capacitive element 14 in the antenna sheet 12.

The antenna substrate 12A is formed using a material having insulation and durability, such as polyethylene terephthalate (PET) and polyethylene naphthalate (PEN).

Figure 3:
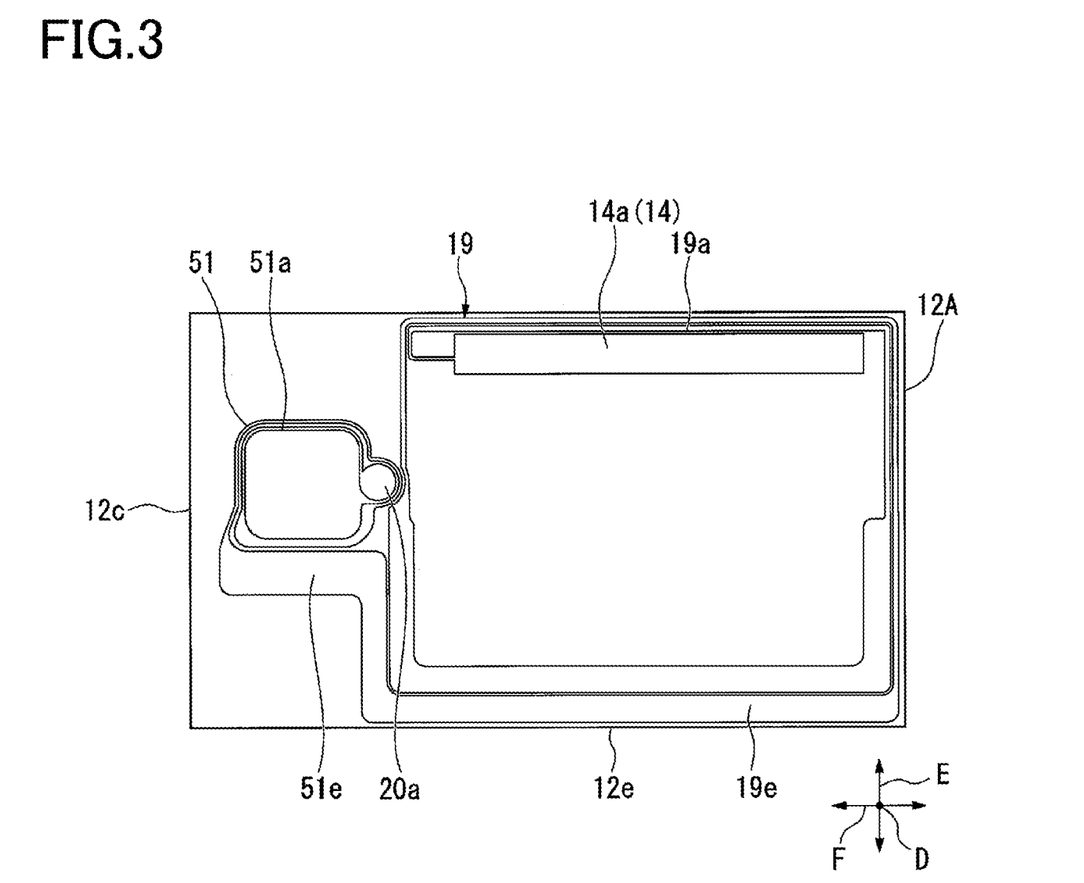
FIG. 3 is a plan view illustrating an antenna sheet of the dual IC card.
Figure 4:
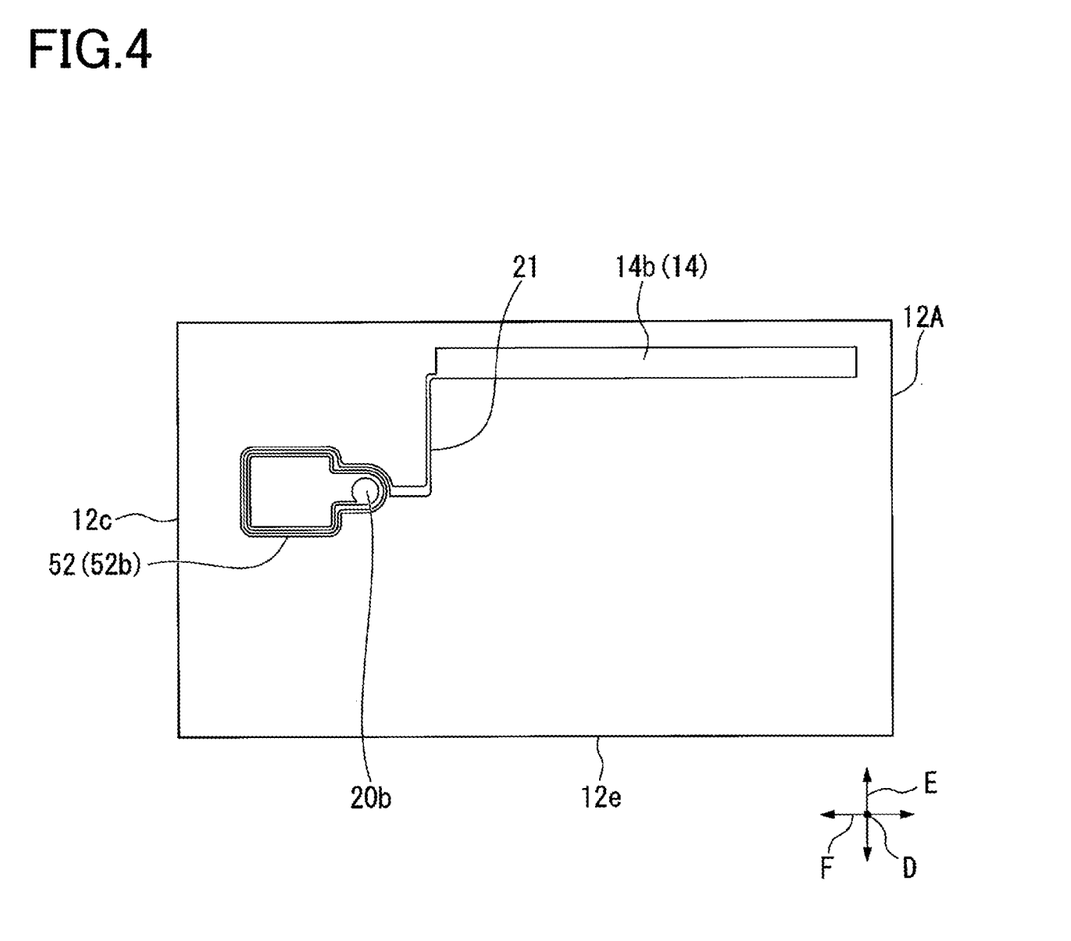
FIG. 4 is a plan view illustrating an antenna sheet of the dual IC card.

As shown in FIGS. 2 to 4, the antenna substrate 12A has a rectangular shape having a long side 12e and a short side 12c in plan view (when viewed in the direction D). The antenna substrate 12A has a thickness, for example, in the range of 15 to 50 µm.

An accommodation hole 12g penetrating in the thickness direction D of the antenna substrate 12A is formed near the short side 12c of the antenna substrate 12A. The accommodation hole 12g is formed as a rectangular shape composed of the sides parallel with the long side 12e and the sides parallel with the short side 12c of the antenna substrate 12A when viewed in the thickness direction D.

The antenna 13 includes a coupling coil 18 that can be electromagnetically coupled to a connecting coil 31 of the IC module 30, described later, and a main coil 19 (antenna coil) connected to the coupling coil 18 to perform contactless communication with a contactless-type external device such as a reader/writer, which is not shown. In the example shown in FIG. 2, the coupling coil 18 is disposed in a coupling coil region R1 in which the accommodation hole 12g is provided, and the main coil 19 is disposed in a main coil region R2 adjacent to the coupling coil region R1. There is provided an embossing area R3 that can be embossed at a position between the long side 12e of the antenna substrate 12A and the accommodation hole 12g according to the IC card standard (X 6302-1: 2005 (ISO/IEC 7811-1: 2002)).

As shown in FIGS. 1 and 2, the capacitive element 14 includes an electrode plate 14a provided on the first surface 12a of the antenna substrate 12A, and an electrode plate 14b provided on the second surface 12b on a side opposite to the first surface 12a. The electrode plate 14a and the electrode plate 14b are disposed to face each other with the antenna substrate 12A interposed therebetween.

As shown in FIG. 3, the electrode plate 14a is connected to an end of an element wire 19a located innermost in the main coil 19. As shown in FIG. 4, the electrode plate 14b is connected to a connecting wiring 21 provided on the second surface 12b. The connecting wiring 21 is connected to a first end of an element wire 52b of a second surface coil 52, which is described later. The capacitive element 14 is serially connected between the coupling coil 18 and the main coil 19.

The antenna 13, the capacitive element 14, and the connecting wiring 21 can be formed, for example, by etching a copper foil or an aluminum foil to which a resist is applied by general gravure printing.

A card substrate 15 has a rectangular shape in plan view. Examples of the material for the card substrate 15 include insulating materials including polyester-based materials such as amorphous polyester, vinyl chloride-based materials such as PVC (polyvinyl chloride), polycarbonate-based materials, and PET-G (a polyethylene terephthalate copolymer).

The card body 10 is formed by sandwiching the antenna sheet 12 between two card substrates 15, joining the antenna sheet 12 and the card substrates 15 together by thermal press lamination, adhesion, or the like, and then punching out into the shape of the card body 10. The card substrate 15 may also be formed by laminating a plurality of substrates.

In the following description, a surface of the card body 10 facing the first surface 12a of the antenna substrate 12A is referred to as a card body front surface 10a, and a surface on a side opposite to the card body front surface 10a is referred to as a card body rear surface 10b.

The recess 11 can be formed, for example, by milling the card substrate 15. The recess 11 has a first accommodation region 24 (first recess) that is open on the card body front surface 10a, and a second accommodation region 25 (second recess) communicating with the first accommodation region 24 and having a width smaller than that of the first accommodation region 24. An opening 11a of the first accommodation region 24 is formed in the card body front surface 10a. The second accommodation region 25, penetrating through the antenna substrate 12A, forms an accommodation hole 12g of the antenna substrate 12A.

Further, the recess 11 has a rectangular shape composed of two sides (first sides) parallel with the long side of the card substrate 15 and two sides (second sides) parallel with the short sides of the card substrate 15 when viewed in the thickness direction D.

As shown in FIG. 2, in plan view, the first accommodation region 24 has a first side surface 24c parallel with the short side 12c, a second side surface 24d opposed to the first side surface 24c, a third side surface 24e parallel with the long side 12e, and a fourth side surface 24f opposed to the third side surface 24e.

As shown in FIGS. 1 and 2, the coupling coil 18 includes a first surface coil 51 disposed on the first surface 12a (front surface) of the antenna substrate 12A, and the second surface coil 52 disposed on the second surface 12b (rear surface) of the antenna substrate 12A.

As shown in FIG. 3, a first terminal 20a of a substantially circular shape is disposed on a first end of an element wire 51a located innermost in the first surface coil 51. As shown in FIG. 4, a second terminal 20b of a substantially circular shape is disposed on a second end of the element wire 52b located innermost in the second surface coil 52. Further, the shapes of the first terminal 20a and the second terminal 20b may be modified as appropriate.

In order to ensure connection between the first terminal 20a and the second terminal 20b, the first terminal 20a and the second terminal 20b may have a diameter larger than the width of the element wire 51a and the element wire 52b as shown in FIGS. 3 and 4.

In addition, the first terminal 20a and the second terminal 20b partially or entirely overlap each other when viewed in the thickness direction D. The first terminal 20a and the second terminal 20b are electrically connected to each other by known processing such as crimping to thereby form a connecting section.

The coupling coil 18 is formed in a spiral shape when viewed in the thickness direction D. When viewed in the thickness direction D, the first surface coil 51 is provided outside and the second surface coil 52 is provided inside.

In the example shown in FIGS. 1 to 4, the first surface coil 51 is wound twice around the accommodation hole 12g when viewed in the thickness direction D. The second surface coil 52 is wound twice around the accommodation hole 12g when viewed in the thickness direction D.

The coupling coil 18 can be disposed on both surfaces of the antenna substrate 12A. In this case, design freedom of the coupling coil 18, such as the number of turns, arrangement, and the like, can be increased.

In the example shown in FIGS. 1 to 4, the first surface coil 51 is disposed on the first surface 12a of the antenna substrate 12A and, when viewed in the thickness direction D, outside the first accommodation region 24 of the recess 11. Further, the first surface coil 51 is not disposed inside the first accommodation region 24 when viewed in the thickness direction D. In this case, the recess 11 can be formed deep to a position close to the antenna substrate 12A. Accordingly, the coupling coil 18 and the connecting coil 31 of the IC module 30 can be more closely positioned.

In the example shown in FIGS. 2 and 3, an element wire 51e which constitutes the first surface coil 51 inside the embossing area R3 has a width larger than the width of the element wire 51a which constitutes the first surface coil 51 outside the embossing area R3.

The second surface coil 52 is disposed on the second surface 12b of the antenna substrate 12A and, when viewed in the thickness direction D, is outside the second accommodation region 25 of the recess 11.

In addition, the second surface coil 52 is partially or entirely positioned outside the second accommodation region 25 of the recess 11 and inside the first accommodation region 24.

The thickness of the card body 10 significantly changes at a region close to the recess 11. Accordingly, when an external force is applied to bend the card body 10, stress is concentrated on the outer periphery of the bottom of the recess 11. When the coupling coil 18 is disposed near the outer periphery of the bottom of the recess 11, wiring of the coupling coil 18 is likely to be disconnected due to the stress concentration.

Therefore, only from the viewpoint of prevention of disconnection of wiring of the coupling coil 18, the coupling coil 18 is desirably positioned outside the first accommodation region 24 so as not to cross the boundary between the region in which the recess 11 is formed and the region in which the recess 11 is not formed, that is, edges Pc, Pd, Pe, and Pf of the recess 11 when viewed in the thickness direction D.

On the other hand, when the coupling coil 18 is disposed inside the first accommodation region 24 in plan view, the coupling coil 18 can be disposed closer to the connecting coil 31 of the IC module 30 to thereby further enhance electromagnetic connection between them. Accordingly, the contactless communication performance can be improved.

In the example shown in FIGS. 1 to 4, the second surface coil 52 on the second surface 12b is partially or entirely positioned inside the first accommodation region 24. Further, the first surface coil 51 on the first surface 12a is entirely positioned outside the first accommodation region 24.

When the second surface coil 52 is positioned inside the first accommodation region 24, the coupling coil 18 can be disposed closer to the connecting coil 31 of the IC module 30. Further, when the first surface coil 51 is entirely positioned outside the first accommodation region 24, disconnection of wiring of the coupling coil 18 due to the stress concentration can be reduced.

In the example shown in FIGS. 1 to 4, the coupling coil 18 extends to cross one or more of edges Pc, Pd, Pe, and Pf of the recess 11 in the second surface 12b. The second surface 12b of the antenna substrate 12A is less likely to be subjected to stress generated at the edges Pc, Pd, Pe, and Pf of the recess 11 compared with the first surface 12a. Accordingly, by virtue of the coupling coil 18, which extends to cross one or more of the edges Pc, Pd, Pe, and Pf of the recess 11 in the second surface 12b, disconnection of wiring of the coupling coil 18 becomes less likely to occur.

Figure 5:
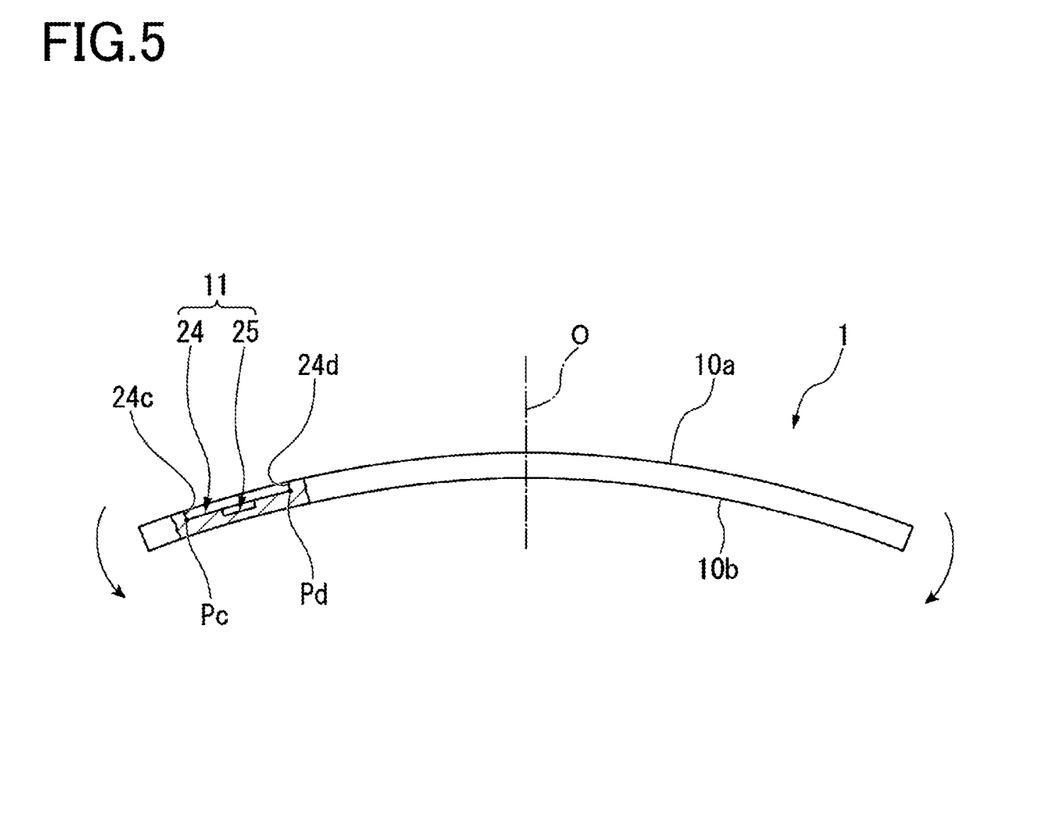
FIG. 5 is a schematic diagram illustrating a state where the dual IC card has been bent and deformed.

A portion of the coupling coil 18 which extends to cross the edges Pc, Pd, Pe, and Pf of the recess 11 may have a width larger than the width of the remaining portion. In this case, disconnection of wiring of the coupling coil 18 can be more appropriately prevented. Further, when the card body 10 is bent with the long side 12e being curved as shown in FIG. 5, the stress generated at the edge Pc, which is an interface between the first side surface 24c of the first accommodation region 24 and the bottom, and the edge Pd, which is an interface between the second side surface 24d and the bottom, is smaller than the stress generated at other edges. Accordingly, when the coupling coil 18 is disposed to cross one or both of the edges Pc and Pd, disconnection of wiring of the coupling coil 18 can be more appropriately prevented.

The main coil 19 is formed in a spiral shape when viewed in the thickness direction D as shown in FIG. 2. In the example shown in FIG. 2, the main coil 19 is wound twice inside the main coil region R2. An element wire 19e which constitutes the main coil 19 inside the embossing area R3 has a width larger than the width of the element wire 19a which constitutes the main coil 19 outside the embossing area R3. In this case, disconnection of wiring of the element wires 19e and 51e in embossing the embossing area R3 can be prevented.

An end of the element wire 19e disposed outermost in the main coil 19 is connected to an end of the element wire 51e disposed outermost in the first surface coil 51.

A width of the element wires 19a and 51a may be, for example, in the range of approximately 0.1 mm to 1 mm, and an interval between the element wires 19a and 51a may be, for example, in the range of approximately 0.1 mm to 1 mm. Further, a width of the element wires 19e and 51e in the embossing area R3 is in the range of approximately 1 mm to 15 mm, and an interval between the element wires 19e and 51e may be, for example, in the range of approximately 0.1 mm to 1 mm.

As shown in FIG. 3, the first surface coil 51, the first terminal 20a, the main coil 19, and the electrode plate 14a are disposed on the first surface 12a of the antenna substrate 12A.

On the other hand, as shown in FIG. 4, the second surface coil 52, the second terminal 20b, and the electrode plate 14b are disposed on the second surface 12b of the antenna substrate 12A.

As shown in FIG. 1, the IC module 30 includes a sheet-shaped module substrate 33, an IC chip 34 and a connecting coil 31 which are provided on a first surface of the module substrate 33, and a plurality of contact terminals (contact terminal portions) 35 provided on a second surface of the module substrate 33. In the example shown in FIG. 1, the first surface of the module substrate 33 faces the first surface 12a of the antenna substrate 12A.

The IC module 30 may further include an IC resin seal 36.

The module substrate 33 is formed in a rectangular shape in plan view. The module substrate 33 may be made of insulating materials such as glass epoxy and polyethylene terephthalate (PET). The thickness of the module substrate 33 is, for example, in the range of 50 to 200 μm.

A known IC chip having a contact communication function and a contactless communication function may be used as the IC chip 34.

The IC chip 34 is adhered to glass epoxy or PET by a die attachment adhesive, and wire bonded to the connecting coil 31 and the contact terminal 35 directly by gold or copper wires with a diameter of 10 to 40 μm or via a pattern wiring connected to the connecting coil 31 and the contact terminal 35 through holes formed in the glass epoxy or PET.

The connecting coil 31 is formed in a spiral shape surrounding the IC chip 34 and the resin seal 36. The connecting coil 31 may be formed, for example, by etching a copper foil or an aluminum foil. The thickness of the connecting coil 31 is, for example, in the range of 5 to 50 μm.

The connecting coil 31 constitutes a contactless communication portion that can be electromagnetically coupled to the coupling coil 18 of the card body 10.

A plurality of contact terminals 35 can be formed, for example, by etching a copper foil provided on the second surface of the module substrate 33. Portions of the copper foil exposed externally may be plated with a nickel layer with a thickness of 0.5 μm to 3 μm, and the nickel layer may be further plated with a gold layer with a thickness of 0.01 μm to 0.3 μm. Plating of a plurality of contact terminals 35 can be performed by electroplating using a plating wiring connected to the contact terminals 35, or electroless plating.

The contact terminals 35 are used for communication with a contact-type external device such as an automatic teller machine. The contact terminals 35 are connected to the IC chip 34 via a wire, which is not shown.

The IC chip 34 is connected to the connecting coil 31 via a wire, which is not shown, such that the IC chip 34, the connecting coil 31, and the wire form a closed circuit.

Further, a plurality of contact terminals 35 may be provided as a lead frame with a thickness in the range of 50 to 200 μm. The connecting coil 31 may be formed of a copper wire.

The resin seal 36 may be made of, for example, a known epoxy resin. When the IC module 30 includes the resin seal 36, the IC chip 34 can be protected, and disconnection of wires can be prevented from occurring.

The IC module 30 is housed in the recess 11 of the card body 10, and bonded to the card body 10 by an adhesive such as a hot-melt sheet to thereby form the dual IC card 1.

FIG. 5 is a schematic diagram illustrating that the dual IC card 1 has been bent and deformed. In FIG. 5, components other than the card body 10 are omitted.

Since the dual IC card 1 is a thin plate of a rectangular shape in plan view, it is deformed by an external force. Depending on the magnitude of an internal stress of the dual IC card 1 caused by the deformation or the number of repeated deformation, disconnection of wiring may occur. In particular, since the dual IC card 1 has the recess 11 for accommodating the IC module 30, stress is concentrated on the recess 11 where the thickness of the card body 10 significantly changes.

For example, as shown in FIG. 5, when the dual IC card 1 is bent with the long side 12e being curved, a bending stress occurs inside the dual IC card 1. The bending stress due to an external force becomes a maximum near an O axis, which is the center axis of the dual IC card 1, and decreases farther from the O axis.

In the recess 11, a larger stress is generated at the edge Pc, which is the interface between the first side surface 24c of the first accommodation region 24 and the bottom, and the edge Pd, which is the interface between the second side surface 24d and the bottom. In particular, a stress generated at the edge Pd, which is closer to the center of the dual IC card 1 (O axis), is larger.

Figure 6:
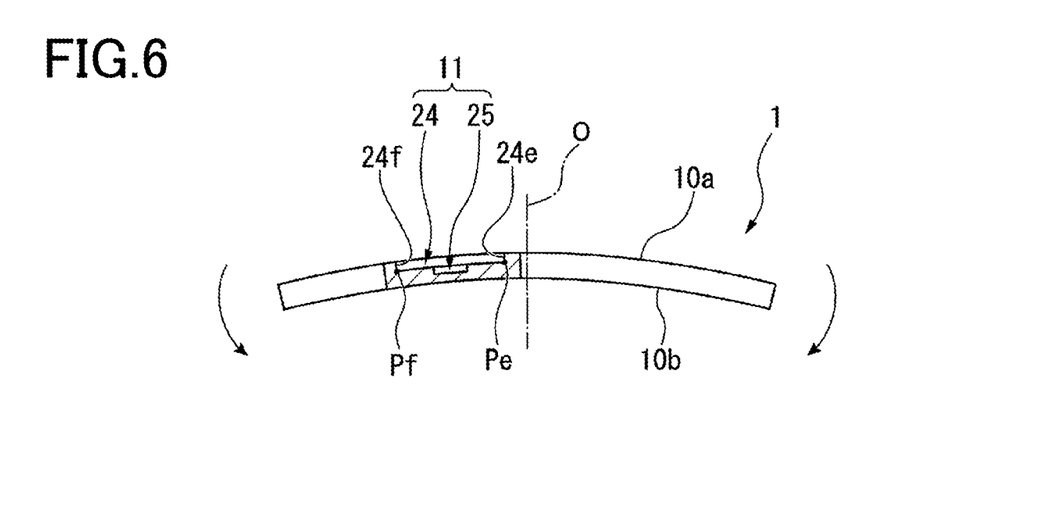
FIG. 6 is a schematic diagram illustrating a state where the dual IC card has been bent and deformed.

Further, as shown in FIG. 6, when the dual IC card 1 is bent with the short side 12c is curved, an internal stress also occurs inside the dual IC card 1. The bending stress due to an external force becomes a maximum near an O axis, which is the center axis of the dual IC card 1, and decreases farther from the O axis.

In the recess 11, a larger stress is generated at the edge Pe, which is the interface between the third side surface 24e of the first accommodation region 24 and the bottom, and the edge Pf, which is the interface between the fourth side surface 24f and the bottom. In particular, stress generated at the edge Pe, which is closer to the center of the dual IC card 1 (O axis), is larger.

Thus, in the configuration of the examples shown in FIGS. 5 and 6, in which the recess 11 is formed such that the edges Pc and Pd are located farther from the center axis O than the edges Pe and Pf are, and the coupling coil 18 is disposed inside the first accommodation region 24 in plan view, disconnection of wiring of the coupling coil 18 can be more appropriately prevented by positioning the second surface coil 52 to cross the edge Pc and/or the edge Pd. That is, in the above configuration, from the viewpoint of prevention of disconnection of wiring of the coupling coil 18, the second surface coil 52 is preferably positioned to cross the edge Pc and/or the edge Pd, which are parallel with the short side 12c of the dual IC card 1 (to cross one or both of the two sides (second sides) parallel with the short side of the card substrate 15 when viewed in the thickness direction D) rather than the edge Pe and the edge Pf, which are parallel with the long side 12e of the dual IC card 1.

Figure 7:
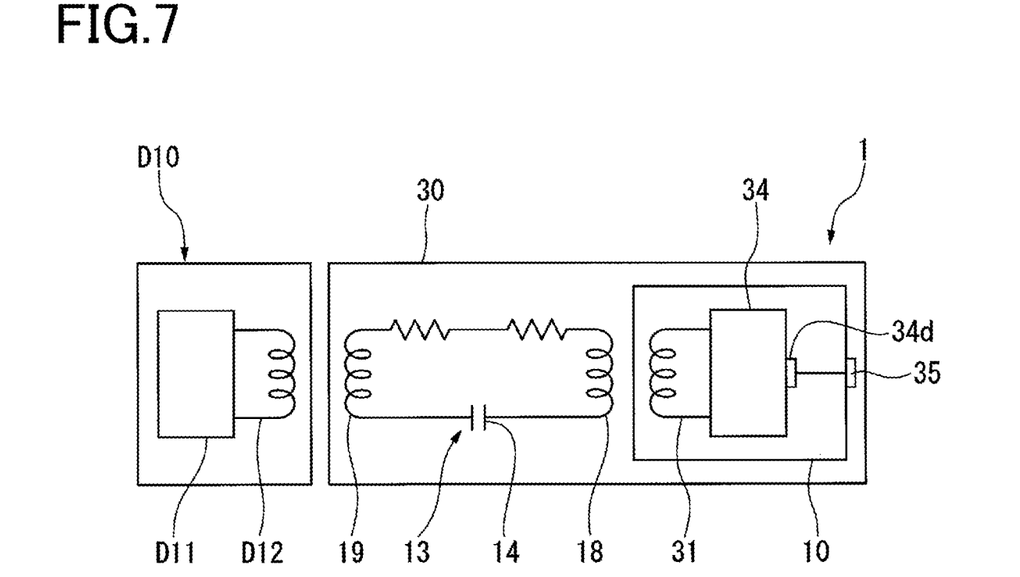
FIG. 7 is an equivalent circuit diagram illustrating an electric connection relationship between the components of the dual IC card.

FIG. 7 is an equivalent circuit diagram illustrating an electric connection relationship between the components of the dual IC card 1.

A high frequency magnetic field is induced in a receiving and transmitting coil D12 by a high frequency signal generated by a receiving and transmitting circuit D11 of a reader/writer (contactless-type external device) D10. The high frequency magnetic field is radiated as magnetic energy.

When the dual IC card 1 is positioned within the high frequency magnetic field, the high frequency magnetic field causes a current to flow through a series resonant circuit configured by the antenna 13 and the capacitive element 14 of the dual IC card 1.

A signal received by a resonant circuit formed of the main coil 19 and the capacitive element 14 is transmitted to the coupling coil 18. The signal is then transmitted to the IC chip 34 through electromagnetic coupling between the coupling coil 18 and the connecting coil 31.

Although not shown in the figure, when power supply and communication are performed between the dual IC card 1 and a contact-type external device such as an automatic teller machine, a terminal provided in the automatic teller machine is brought into contact with the contact terminals 35 of the dual IC card 1. Through this contact communication, power supply and communication are performed between a control unit of the automatic teller machine and the IC chip 34.

The following describes an evaluation of communication characteristics of the dual IC card 1 according to an Example and communication characteristics of a conventional dual IC card (Comparative Example).

In this Example, the coupling coil 18 (second surface coil 52) of the dual IC card 1 is disposed on the second surface 12b of the antenna substrate 12A inside a region in which the recess 11 is formed when viewed in the thickness direction of the card body 10.

On the other hand, in a Comparative Example, a coupling coil of a dual IC card is disposed on a second surface of an antenna substrate outside a region in which a recess is formed when viewed in the thickness direction of the card body.

Figure 8:
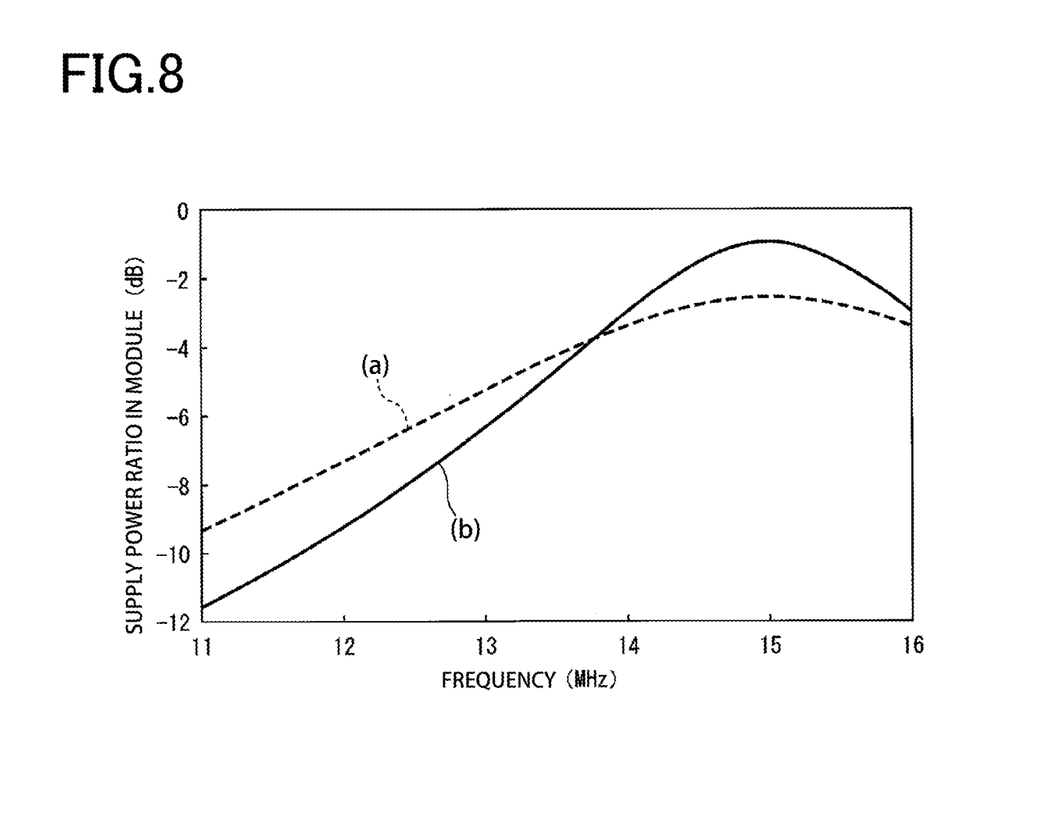
FIG. 8 is a graph showing communication characteristics of an example of the dual IC card.

The dual IC card 1 according to the present Example and the dual IC card according to the Comparative Example have the same configuration except for the arrangement of the coupling coil described above. FIG. 8 shows a result of evaluation for the communication characteristics of these dual IC cards.

In FIG. 8, (a) shows communication characteristics of an Example of the dual IC card 1, and (b) shows communication characteristics of a conventional dual IC card (Comparative Example). In the graph, the horizontal axis represents frequency, and vertical axis represents the ratio of the power supplied to the IC module to the power inputted to the coupling coil (supply power ratio in the IC module).

As seen from FIG. 8, in the dual IC card 1 according to the present Example, a change in supply power due to the frequency is smaller than that of the dual IC card according to the Comparative Example. That is, the dual IC card 1 according to the present Example can perform power supply at a predetermined level or more in a wide frequency band. On the other hand, in the dual IC card according to the Comparative Example, it is found that a difference between the supply power at a peak frequency (near 15 MHz in FIG. 8) and the supply power in the other frequency band is large.

Therefore, according to the dual IC card 1 of the present Example, a dual IC card which covers a wider communication frequency band can be provided.

According to the aforementioned dual IC card 1, the coupling coil 18 includes the second surface coil 52 provided on the second surface 12b of the antenna substrate 12A, and at least part of the second surface coil 52 is positioned inside a region of the card body 10 in which the recess 11 is formed when viewed in the thickness direction. Accordingly, the coupling coil 18 and the connecting coil 30 of the IC module can be electromagnetically connected in an effective manner. As a result, a dual IC card which covers a wider communication frequency band can be provided. In this configuration, the first surface coil 51 may be omitted.

Further, when the coupling coil 18 further includes the first surface coil 51 provided on the first surface 12a of the antenna substrate 12A, the coupling coil 18 can be provided on both surfaces of the antenna substrate 12A. Accordingly, design freedom of the coupling coil 18, such as the number of turns, arrangement, and the like, can be increased.

Further, when the first surface coil 51 is provided outside the recess 11 (first accommodation region 24), disconnection of wiring of the first surface coil 51 due to the stress concentration can be more appropriately prevented.

Further, when viewed in the thickness direction D, when a portion of the coupling coil 18 (second surface coil 52) which extends to cross the edges of the recess 11 has a width larger than the width of the remaining portion, occurrence of disconnection of wiring of the coupling coil 18 can be more appropriately prevented. In this configuration, the first surface coil 51 may be omitted.

When at least part of the second surface coil 52 is positioned inside a region in which the first accommodation region 24 is formed and outside a region in which the second accommodation region 25 is formed when viewed in the thickness direction of the card body 10, a distance between the coupling coil 18 (second surface coil 52) and the connecting coil 31 of the IC module 30 in the thickness direction D is small. Accordingly, the coupling coil 18 and the connecting coil 31 can be even more reliably electromagnetically coupled. Further, when viewed in the thickness direction D, the element wire of the coupling coil 18 (second surface coil 52) is positioned close to the element wire of the connecting coil 31 of the IC module 30. Accordingly, the coupling coil 18 and the connecting coil 31 can be even more effectively electromagnetically coupled.

Furthermore, when the coupling coil 18 is positioned on the second surface 12b (rear surface) and is not positioned on the first surface 12a (front surface) inside a region in which the recess 11 (first accommodation region 24) is formed when viewed in the thickness direction D, the recess 11 can be formed deep by milling or the like to a position near the first surface 12a (front surface) of the antenna substrate 12A. Compared with the case where the coupling coil 18 is positioned on the first surface 12a (front surface), a tolerance in milling or the like can be increased. Even if the recess 11 formed by milling reaches the first surface 12a (front surface) of the antenna substrate 12A, the coupling coil 18 and the connecting coil 31 of the IC module 30 can be electromagnetically coupled for contactless communication unless the wiring of the coupling coil 18 on the second surface 12b (rear surface) is disconnected.

When the recess 11 is formed deeper, the connecting coil 31 of the IC module 30 and the coupling coil 18 of the card body 10 can be more closely positioned to thereby increase their electromagnetic coupling. Accordingly, the contactless communication performance can be improved.

The improvement in contactless communication performance described above contributes, for example, to capacitance adjustment of the capacitive element 14, which is required for adjustment of the resonance frequency at which electromagnetic coupling between the coupling coil 18 and the connecting coil 31 of the IC module 30 is performed. Accordingly, the effort required to adjust capacitance depending on the types of the IC module 30 is reduced. This is effective for reduction of load in designing of the antenna sheet 12. Further, since the tolerance of resonance frequency of the IC card is increased, resonance frequency can be easily managed in manufacturing. In addition, since the yield is improved, the cost can be reduced.

Although an embodiment of the present invention is described in detail with reference to the drawings, specific configurations are not limited to this embodiment. Various modifications and combinations of the components can be made without departing from the spirit of the present invention.

The main coil 19 can be partially or entirely positioned on the second surface 12b. Design freedom of the main coil 19, such as the number of turns, arrangement, and the like, can be increased.

INDUSTRIAL APPLICABILITY

According to some aspects of the above embodiment, a dual IC card and an antenna sheet having higher contactless communication performance can be provided. Further, according to some aspects of the above embodiment, a dual IC card and an antenna sheet having higher durability can be provided.

REFERENCE SIGNS LIST

1 . . . dual IC card; 10 . . . card body; 10a . . . card body front surface; 10b . . . card body rear surface; 11 . . . recess; 11a . . . opening; 12 . . . antenna sheet; 12A . . . antenna substrate; 12a . . . first surface; 12b . . . second surface; 12c . . . short side; 12e . . . long side 12g . . . accommodation hole; 13 . . . antenna; 14 . . . capacitive element; 14a, 14b . . . electrode plate; 15 . . . card substrate; 18 . . . coupling coil. 19 . . . main coil (antenna coil); 19a, 19e . . . element wire; 20a . . . first terminal; 20b . . . second terminal; 21 . . . connecting wiring 24 . . . first accommodation region (first recess); 24a, 24b, 24c, 24d . . . side surface; 25 . . . second accommodation region (second recess); 30 . . . IC module; 31 . . . connecting coil; 33 . . . module substrate; 34 . . . IC chip; 35 . . . contact terminal (contact terminal portion); 36 . . . resin seal; 51 . . . first surface coil; 51a, 51e . . . element wire; 52 . . . second surface coil; 52b . . . element wire; D . . . thickness direction; D10 . . . reader/writer; Pc, Pd, Pe, Pf . . . edge.

What is claimed is:
1. A dual IC card comprising:
an IC module that includes an IC chip having both a contact-type transmission function and a contactless-type transmission function, and a module substrate having an external terminal, which is a contact-type transmission portion, and a connecting coil, which is a contactless-type transmission portion;
an antenna sheet that includes an antenna substrate having a first surface and a second surface, a coupling coil having a second surface coil provided on a second surface of the antenna substrate, the coupling coil being configured to be electromagnetically coupled to the connecting coil of the IC module, and an antenna coil connected to the coupling coil for contactless communication with a contactless-type external device; and
a card body in a plate-shape which houses the antenna sheet and has a recess for accommodating the IC module, wherein
the second surface coil is positioned entirely inside a region in which the recess of the card body is formed when viewed in a thickness direction of the card body and wherein the second surface coil includes at least two turns, wherein the coupling coil further includes a first surface coil provided on a first surface of the antenna substrate, and a connecting section that connects the first surface coil and the second surface coil, and, wherein the first surface coil is positioned entirely outside the region of the card body in which the recess is formed when viewed in the thickness direction of the card body.

2. The dual IC card of claim 1, wherein
the recess of the card body includes a first recess formed near a front surface of the card body, and a second recess communicating with the first recess and having an opening width smaller than the first recess, and
at least part of the second surface coil is positioned inside a region in which the first recess is formed and the second recess is not formed when viewed in the thickness direction of the card body.

3. An antenna sheet comprising:
an antenna substrate having a first surface and a second surface, a coupling coil configured to be electromagnetically coupled to a connecting coil of an IC module, and an antenna coil connected to the coupling coil for contactless communication with a contactless-type external device, wherein the coupling coil includes a first surface coil provided on a first surface of the antenna substrate, a second surface coil provided on a second surface of the antenna substrate, and a connecting section that connects the first surface coil and the second surface coil, the second surface coil is entirely positioned inside a region of the card body in which the recess is formed when viewed in the thickness direction of the card body, wherein the second surface coil includes at least two turns; and, wherein the first surface coil is positioned entirely outside the region of the card body in which the recess is formed when viewed in the thickness direction of the card body.

* * * * *